United States Patent
Kanayama et al.

(10) Patent No.: US 9,033,589 B2
(45) Date of Patent: May 19, 2015

(54) OPTICAL FIBER CABLE PROCESSING DEVICE, METHOD FOR PROCESSING THE SAME, AND CASE FOR OPTICAL FIBER CABLE

(71) Applicant: Sony Corporation, Tokyo (JP)

(72) Inventors: Fujio Kanayama, Kanagawa (JP); Tsuyoshi Ogawa, Kanagawa (JP); Kazuyoshi Yamada, Tokyo (JP); Toru Terada, Ishikawa (JP); Shuichi Otaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 20 days.

(21) Appl. No.: 14/068,580

(22) Filed: Oct. 31, 2013

(65) Prior Publication Data

US 2014/0126871 A1   May 8, 2014

(30) Foreign Application Priority Data

Nov. 8, 2012 (JP) .................................. 2012-246766

(51) Int. Cl.
 *G02B 6/44* (2006.01)
 *G02B 6/38* (2006.01)
(52) U.S. Cl.
 CPC ............ *G02B 6/4446* (2013.01); *G02B 6/4457* (2013.01); *G02B 6/4479* (2013.01); *G02B 6/3898* (2013.01)

(58) Field of Classification Search
 USPC ............. 385/71, 88–90, 147, 135; 29/33, 460
 See application file for complete search history.

(56) References Cited

U.S. PATENT DOCUMENTS

| | | | |
|---|---|---|---|
| 2005/0238464 A1* | 10/2005 | Matsuoka et al. ............. | 414/217 |
| 2014/0126871 A1* | 5/2014 | Kanayama et al. ........... | 385/135 |
| 2014/0217669 A1* | 8/2014 | Aoji et al. ..................... | 271/297 |

FOREIGN PATENT DOCUMENTS

JP    3301253    4/2002

\* cited by examiner

*Primary Examiner* — Akm Enayet Ullah
(74) *Attorney, Agent, or Firm* — Dentons US LLP

(57) ABSTRACT

An optical fiber cable processing device includes a transport mechanism which transports a case that accommodates an optical fiber cable and in which plural work stations are set along a transport path, and a processing mechanism that performs each of desired operations on the optical fiber cable, in which any one of the plural work stations is a mounting station in which a work mounting mechanism mounts a work on a tip of the optical fiber cable, a drawing mechanism that draws out the optical fiber cable and a correction mechanism that corrects a bending tendency of the optical fiber cable are disposed in the work stations on an upstream side of the mounting station, and the transport mechanism transports the case to the mounting station and mounts the work on the tip of the optical fiber cable in a state where the optical fiber cable is drawn out.

11 Claims, 12 Drawing Sheets

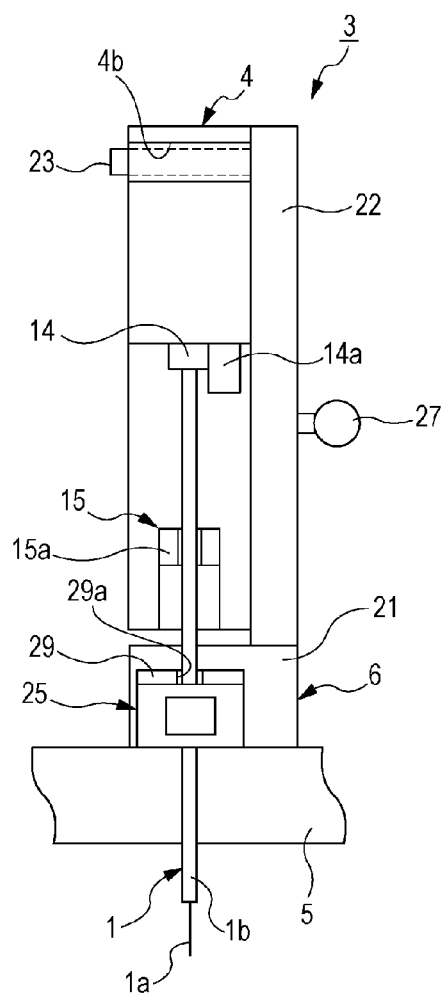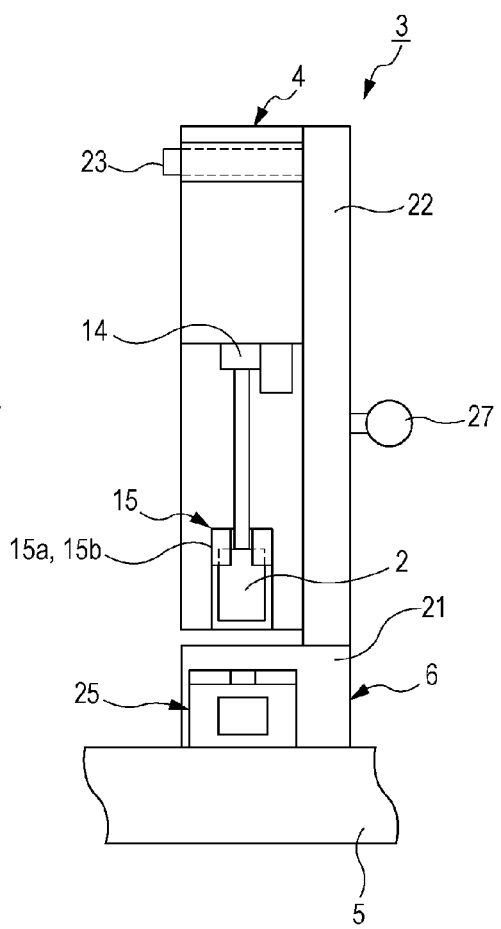

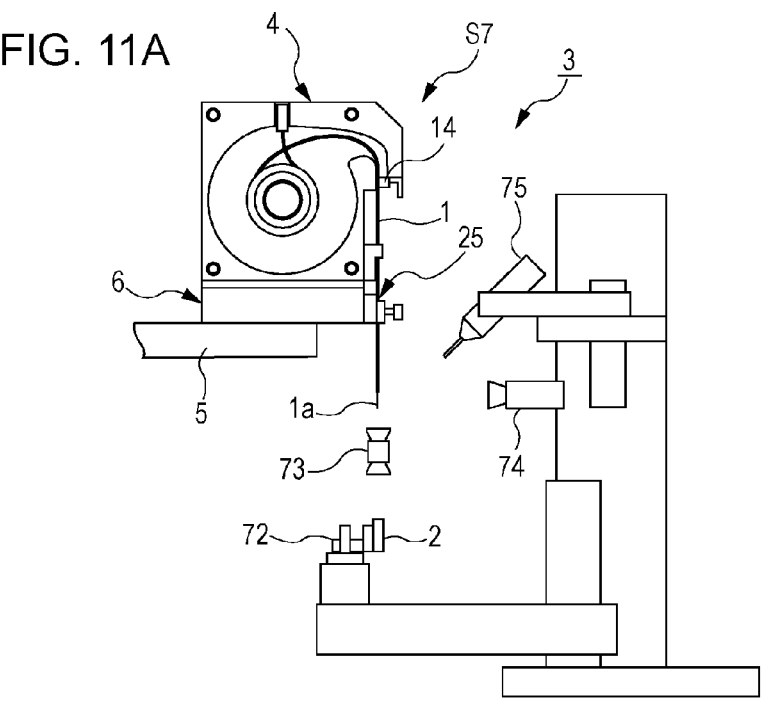
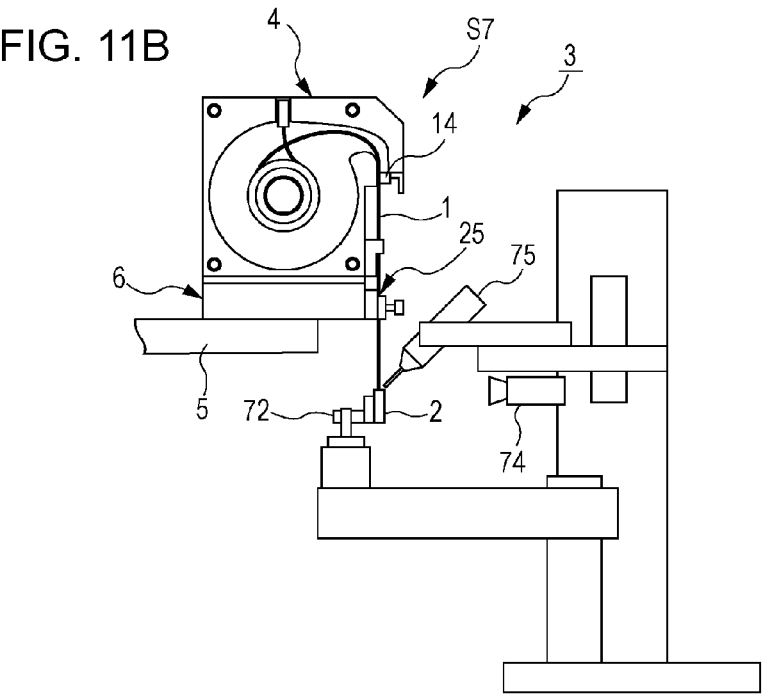

OPTICAL FIBER CABLE PROCESSING DEVICE, METHOD FOR PROCESSING THE SAME, AND CASE FOR OPTICAL FIBER CABLE

CROSS REFERENCE TO RELATED APPLICATIONS

This application claims the benefit of Japanese Priority Patent Application JP 2012-246766 filed Nov. 8, 2012, the entire contents of which are incorporated herein by reference.

BACKGROUND

The present disclosure relates to an optical fiber cable processing device, a method for processing the same, and a case for an optical fiber cable, and more particularly, to an optical fiber cable processing device that performs a desired operation on an optical fiber cable which is accommodated in a case, a method for processing the same, and a case to accommodate an optical fiber cable.

In the related art, optical fiber cables that are optical fibers coated with a resin coating or the like are known, and works such as substrates, ferrules and connectors are mounted on end portions of the optical fiber cables.

When the above-described work is mounted on the optical fiber cable, the optical fiber is exposed first by removing the coating of the optical fiber cable and then the end surface of the optical fiber is cut into a desired shape so that the work is mounted on the end surface of the optical fiber.

An optical fiber cable processing device described, for example, in Japanese Patent No. 3301253 is known to perform such operation, which includes a transport mechanism that transports a case which accommodates an optical fiber cable and in which a plurality of work stations are set along a transport path of the case, and a processing mechanism that is disposed in each of the work stations to perform the desired operation on the optical fiber cable.

SUMMARY

However, in the optical fiber cable processing device according to Japanese Patent No. 3301253, the optical fiber cable is wound in the case, and thus a bending tendency remains in the optical fiber cable that is drawn out when the optical fiber cable is drawn out so that the processing is performed thereon in each of the work stations.

In addition, in the optical fiber cable processing device according to Japanese Patent No. 3301253, the optical fiber cable that is processed in each of the work stations is returned to the case, and thus the bending tendency is not uniform when the optical fiber cable is drawn out again in each of the work stations.

Accordingly, there is a case where a holding failure occurs when the optical fiber cable is held in each of the work stations. Also, when the bending tendency remains in the optical fiber, much time is taken for the positioning when the work is mounted on the optical fiber to cause the cycle time to be lengthened.

In view thereof, the present disclosure provides an optical fiber cable processing device and an optical fiber cable processing method by which an optical fiber cable is reliably held in each of work stations, and a case for an optical fiber cable suitable for use in the optical fiber cable processing device.

According to a first embodiment of the present disclosure, there is provided an optical fiber cable processing device that includes a transport mechanism which transports a case that accommodates an optical fiber cable that is an optical fiber coated with a coating material and in which a plurality of work stations are set along a transport path of the case, and a processing mechanism that is disposed in each of the work stations to perform each of desired operations on the optical fiber cable, in which any one of the plurality of work stations is a mounting station in which a work mounting mechanism mounts a work on a tip of the optical fiber cable, a drawing mechanism that draws out the optical fiber cable by a predetermined length from the case and a correction mechanism that corrects a bending tendency of the optical fiber cable that is drawn out of the case are disposed in the work stations on an upstream side of the mounting station, and the transport mechanism transports the case to the mounting station and mounts the work on the tip of the optical fiber cable that is drawn out of the case in a state where the optical fiber cable which is corrected by the correction mechanism is drawn out of the case.

In the optical fiber cable processing device according to a second embodiment of the present disclosure, the coating material may be a thermoplastic resin, the correction mechanism may include two plates that pinch the optical fiber cable, a heater that heats the plates, and an opening and closing mechanism that brings the plates into contact with each other or separates the plates from each other, a linear groove is formed in one of the plates and a protrusion that is fitted into the groove is formed in the other of the plates, and the bending tendency of the optical fiber cable may be corrected by heat from the heater in a state where the two plates are caused to approach each other by the opening and closing mechanism so that the optical fiber cable has a linear shape by the groove and the protrusion.

In the optical fiber cable processing device according to a third embodiment of the present disclosure, the drawing mechanism may be disposed in a drawing station and the correction mechanism may be disposed in a correction station which is placed on a downstream side of the drawing station, and the bending tendency of the optical fiber cable that is drawn out in the drawing station may be corrected in the correction station.

In the optical fiber cable processing device according to a fourth embodiment of the present disclosure, the case may have an accommodation space that accommodates the optical fiber cable, a core portion that is disposed in the accommodation space so that the optical fiber cable is wound therearound, a guide space that is formed to be adjacent to the accommodation space so as to guide an end portion of the optical fiber cable outward, and an opening and closing member that opens or closes a guide hole of the guide space to hold the optical fiber cable, the optical fiber cable may not be drawn out of the case when the opening and closing member is in a closed state, an opening and closing member moving mechanism that puts the opening and closing member into an open state may be disposed in the work station in which the drawing mechanism is disposed, and the opening and closing member moving mechanism may put the opening and closing member into the open state to allow the optical fiber cable to be drawn out of the case when the drawing mechanism causes the optical fiber cable to be drawn out of the case.

In the optical fiber cable processing device according to a fifth embodiment of the present disclosure, the core portion of the case may be formed into a hollow cylindrical shape and an end portion thereof may be disposed to be open outward, the transport mechanism may include a substantially cylindrical insertion unit that is fitted onto an inner circumferential surface of the core portion, and an engaging protrusion that protrudes from an inner portion of the insertion unit to an outer circumferential surface side and is engaged with an engaged portion that is formed on the inner circumferential surface of the core portion, and the insertion unit may be inserted and fitted into the core portion of the case and the engaging protrusion may be engaged with the engaged portion of the core portion so that the case is held by the transport mechanism when the case is supplied to the transport mechanism.

In the optical fiber cable processing device according to a sixth embodiment of the present disclosure, a returning station that returns the optical fiber cable which is drawn out of the case into the case may be disposed on a downstream side of the mounting station, a work holding member that accommodates the work which is mounted on the tip of the optical fiber cable may be disposed in the case, and a returning mechanism that returns the optical fiber cable into the case and a work installation guide mechanism that guides the work to be held by the work holding member when the optical fiber cable is returned into the case by the returning mechanism may be disposed in the returning station.

According to a seventh embodiment of the present disclosure, there is provided an optical fiber cable processing method in which a case which accommodates an optical fiber cable which is an optical fiber coated with a coating material is transported by a transport mechanism in which a plurality of work stations are set along a transport path and each of desired operations is performed on the optical fiber cable by a processing mechanism that is disposed in each of the work stations, any one of the plurality of work stations is a mounting station in which a work mounting mechanism mounts a work on a tip of the optical fiber cable, a drawing mechanism draws out the optical fiber cable by a predetermined length from the case and a correction mechanism corrects a bending tendency of the optical fiber cable that is drawn out of the case in the work stations on an upstream side of the mounting station, and the transport mechanism then transports the case to the mounting station and mounts the work on the tip of the optical fiber cable that is drawn out of the case in a state where the optical fiber cable which is corrected is drawn out of the case.

According to an eighth embodiment of the present disclosure, there is provided a case for an optical fiber cable which accommodates an optical fiber cable that is an optical fiber coated with a coating material in which the case includes an accommodation space that accommodates the optical fiber cable, a core portion that is disposed in the accommodation space so that the optical fiber cable is wound therearound, a guide space that is formed to be adjacent to the accommodation space so as to guide an end portion of the optical fiber cable outward, and an opening and closing member that opens or closes a guide hole of the guide space to hold the optical fiber cable, and the optical fiber cable is prevented from being drawn out of the case by putting the opening and closing member into a closed state.

In the case for an optical fiber cable according to a ninth embodiment of the present disclosure, the core portion may be formed into a hollow cylindrical shape and an end portion thereof may be disposed to be open outward, and the case may be held by a case holding mechanism that has a substantially cylindrical insertion unit that can be inserted into an opening portion of the core portion, and an engaging protrusion that protrudes from an inner portion of the insertion unit to an outer circumferential surface and is engaged with a protrusion that is formed on an inner circumferential surface of the core portion.

In the case for an optical fiber cable according to a tenth embodiment of the present disclosure, a plurality of insertion holes that are parallel with an axial direction of the core portion may be bored at positions which avoid the accommodation space and the guide space, the case holding mechanism may be disposed in parallel with an axial direction of the insertion unit and may have a support rod which is inserted into the insertion hole, and the support rod may be inserted into the insertion hole and the case may be held not to be rotated when the insertion unit is inserted into the core portion.

In the case for an optical fiber cable according to an eleventh embodiment of the present disclosure, a work holding member that holds a work which is mounted on the end portion of the optical fiber cable may be disposed at a position that is adjacent to the guide hole of the guide space, and the work may be prevented from being detached from the work holding member by putting the opening and closing member into the closed state in a state where the work is accommodated by the work holding member.

According to the optical fiber cable processing device of the first embodiment of the present disclosure, the optical fiber cable is drawn out by the drawing mechanism and the bending tendency of the optical fiber cable that is drawn out is corrected by the correction mechanism.

As a result, the corrected optical fiber cable is supplied to the mounting station in a state of being drawn out of the case, and thus a connection between the optical fiber cable and the work can be reliably performed in the mounting station.

In other words, the position of the optical fiber cable in each of the work stations can be uniform so as to prevent a holding failure as much as possible and shorten the cycle time.

According to the second embodiment of the present disclosure, the bending tendency of the optical fiber cable can be reliably corrected in the case where the coating material is the thermoplastic resin.

According to the third embodiment of the present disclosure, the drawing out of the optical fiber cable and the correction of the bending tendency are performed in the different work stations, and thus the cycle time in each of the work stations can be shortened and the configurations of the work stations can be simplified.

According to the fourth embodiment of the present disclosure, the opening and closing member is disposed in the case, and thus the optical fiber cable can be prevented from being drawn out due to carelessness and the optical fiber cable can be drawn out by the opening and closing member moving mechanism if necessary.

According to the fifth embodiment of the present disclosure, the case can be reliably fixed by the transport mechanism, and thus the drawing mechanism can reliably draw out the optical fiber cable from the case.

According to the sixth embodiment of the present disclosure, the optical fiber cable can be returned into the case in the returning station, and thus the transport of the case can be facilitated thereafter.

In this case, the work installation guide allows the work to be reliably held by the work holding member.

According to the optical fiber cable processing method of the seventh embodiment of the present disclosure, the optical fiber cable is drawn out by the drawing mechanism and the bending tendency of the optical fiber cable that is drawn out is corrected by the correction mechanism.

As a result, the corrected optical fiber cable is supplied to the mounting station in the state of being drawn out of the case, and thus the connection between the optical fiber cable and the work can be reliably performed in the mounting station.

In other words, the position of the optical fiber cable in each of the work stations can be uniform so as to prevent the holding failure as much as possible and shorten the cycle time.

According to the case for an optical fiber cable of the eighth embodiment of the present disclosure, the optical fiber cable can be transported to each of the work stations in the state of being drawn out of the case as in the optical fiber cable processing device of the first embodiment of the present disclosure and the optical fiber cable processing method of the seventh embodiment of the present disclosure.

In this case, the opening and closing member can be put into the closed state and the drawing out of the optical fiber cable can be prevented, and thus the optical fiber cable can be prevented from being drawn out due to carelessness when the processing is performed in each of the work stations.

According to the ninth embodiment of the present disclosure, the insertion unit of the case holding mechanism is inserted into the hollow cylindrical core portion so that the case can be held, and the engaging protrusion is engaged with the protrusion of the core portion so that the case can be held not to be detached.

According to the tenth embodiment of the present disclosure, the case in which the insertion unit of the case holding mechanism is inserted into the core portion can be held not to be rotated by inserting the support rod into the insertion hole, and the operation such as the drawing out of the optical fiber cable can be reliably performed in the optical fiber cable processing device.

According to the eleventh embodiment of the present disclosure, the work holding member is disposed, and thus the work can be prevented from being detached from the work holding member during the transport of the case after the work is mounted on the optical fiber cable.

BRIEF DESCRIPTION OF THE DRAWINGS

FIGS. 4A and 4B are front views of the case, respectively showing a state where an optical fiber cable is held by a cable holding unit and a state where a work is held by a work holding member;

FIGS. 11A and 11B are views showing a mounting station, respectively showing a state where positions of an optical fiber and the work are confirmed and a state where the work is mounted.

DETAILED DESCRIPTION OF EMBODIMENTS

Figure 1:
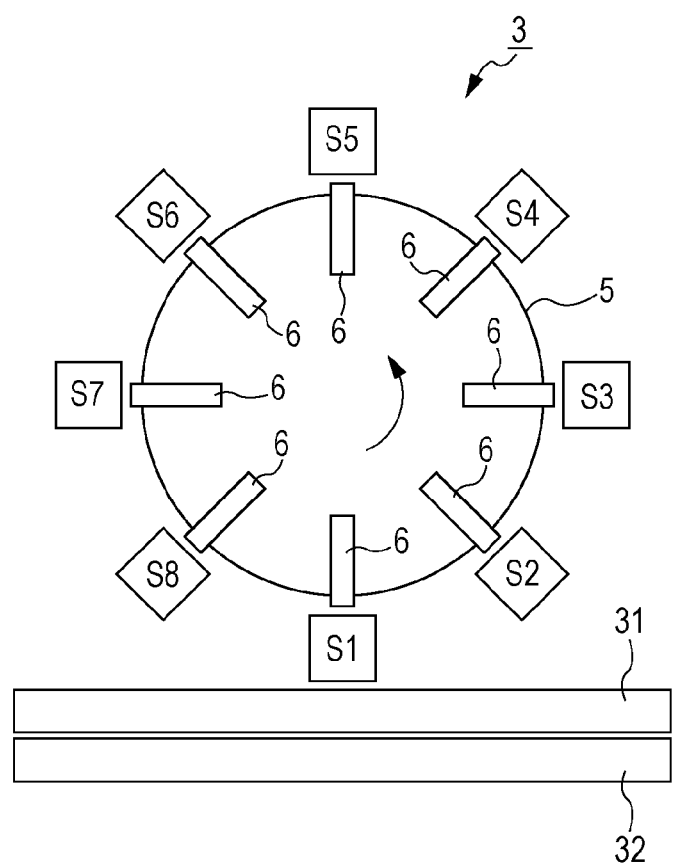
FIG. 1 is a plan view of an optical fiber cable processing device according to an embodiment.

An embodiment, shown in the accompanying drawings, will be described hereinafter. FIG. 1 shows a plan view of an optical fiber cable processing device 3 in which a work 2 is mounted on an optical fiber cable 1.

Figure 2:
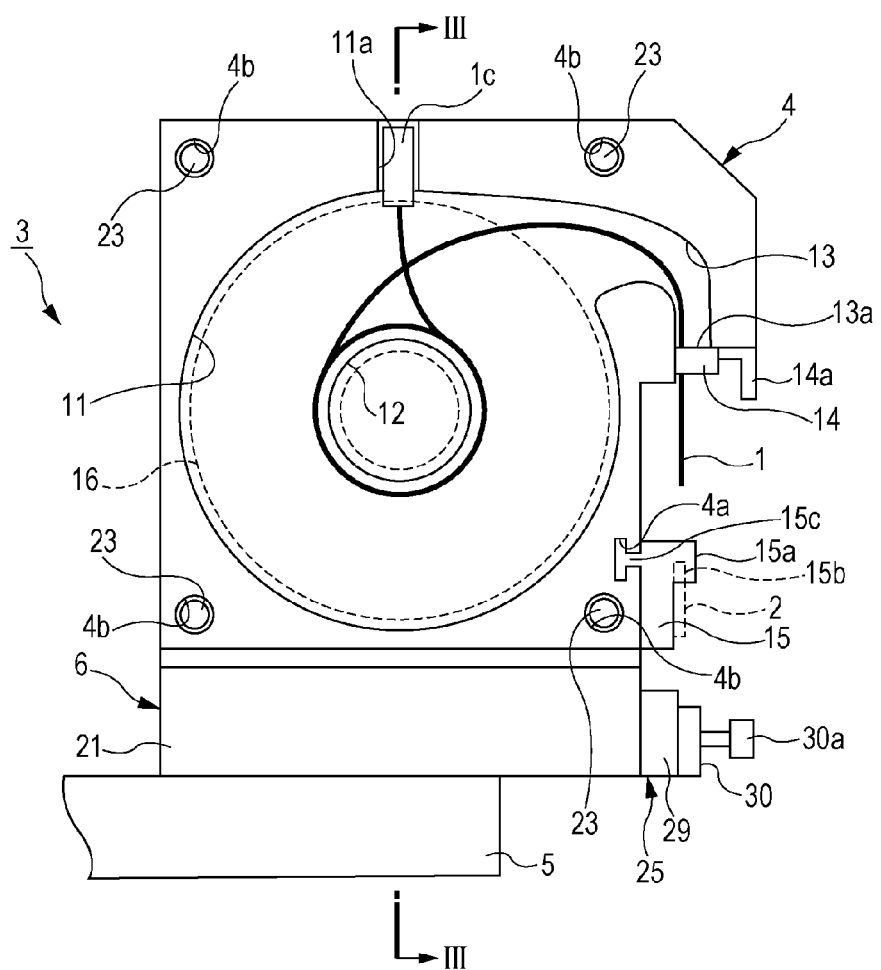
FIG. 2 is a side view of a case and a case holding unit.

The optical fiber cable 1 is configured to have an optical fiber 1a whose outer circumference is coated with a coating material 1b formed of a thermoplastic resin (refer to FIG. 7B), and is supplied in a wound state in cases 4 of the optical fiber cable processing device 3 shown in FIG. 2.

Examples of the work 2 include a ferrule and a connector in addition to an electronic substrate. In the embodiment, the work 2 is a substantially rectangular and flat plate-shaped electronic substrate, and the optical fiber 1a is connected to an end portion of the electronic substrate.

In the optical fiber cable processing device 3, the optical fiber 1a is exposed by removing the coating material 1b of a tip portion of the optical fiber cable 1. The exposed optical fiber 1a is cut at a desired position so that the work 2 is connected to an end portion of the optical fiber 1a.

The optical fiber cable processing device 3 has a rotating table 5 as a transport mechanism that transports the case 4 and is set with a plurality of work stations S along a transport path of the case 4. In each of the work stations S, a desired operation is performed on the optical fiber cable 1.

In FIG. 1, the rotating table 5 transports the case 4 in the counterclockwise direction shown in the drawing, and a supply and discharge station S1 that supplies and discharges the case 4 to and from the rotating table 5, a drawing station S2 that draws the optical fiber cable 1 out of the case 4, a correction station S3 that removes a bending tendency of the optical fiber cable 1, a coating removal station S4 that removes the coating material 1b of the tip portion of the optical fiber cable 1, a cleaning station S5 that cleans the exposed optical fiber 1a, a cutting station S6 that cuts an end surface of the optical fiber 1a so that the work 2 can be connected thereto, a mounting station S7 that mounts the work 2 on a tip of the optical fiber 1a, and a returning station S8 that re-accommodates the drawn optical fiber cable 1 in the case 4 are set in order from the work station S in the lower end section of the drawing.

The rotating table 5 has the same number of, that is, eight case holding units 6 as the work stations S1 to S8, and the rotating table 5 rotates intermittently with a gap between the case holding units 6 being one pitch.

The case 4 will be described referring to FIGS. 2 to 4B. The case 4 is formed to be a substantially rectangular parallelepiped. An accommodation space 11 that accommodates the optical fiber cable 1, a core portion 12 that is disposed at the center of the accommodation space 11 with the optical fiber cable 1 being wound therearound, and a guide space 13 that is formed to be adjacent to the accommodation space 11 so as to guide an end portion of the optical fiber cable 1 outward are formed in the case 4.

An opening and closing member 14 that opens and closes the guide hole 13a and holds the optical fiber cable 1 is disposed in a guide hole 13a of the guide space 13. A work holding member 15 that accommodates the work 2 which is mounted on the tip of the optical fiber 1a is disposed below the guide hole 13a.

Figure 3:
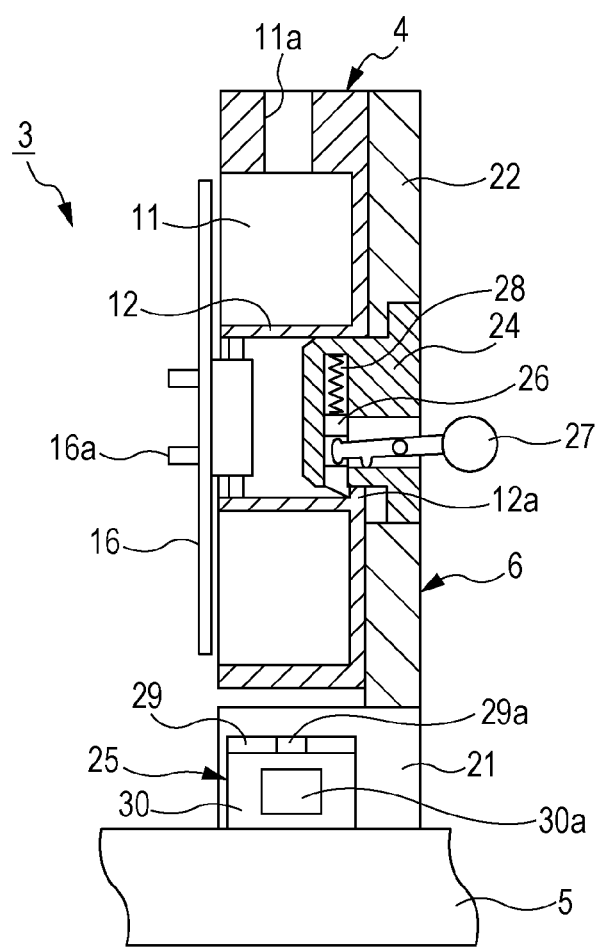
FIG. 3 is a cross-sectional view taken along line II-II of FIG. 2.

The accommodation space 11 is formed to be substantially circular, and the optical fiber cable 1 is accommodated therein in a state of being wound around the core portion 12. As shown in FIG. 3, a side surface of the case 4 in the left section of the drawing is open outward.

One end of the optical fiber cable 1 that is accommodated in the accommodation space 11 is guided by the guide space 13 and drawn out of the guide hole 13a. The work 2 is mounted on the end portion of the optical fiber cable 1 which is exposed outward.

The other end of the optical fiber cable 1 is accommodated in the accommodation space 11 with a work 1c being mounted in advance on the other end. As shown in FIG. 2, the work 1c is inserted into an insertion hole 11a formed in an upper portion of the accommodation space 11 from inside thereof.

The core portion 12 has a hollow cylindrical shape, and the optical fiber cable 1 is wound around an outer circumferential surface thereof.

As shown in FIG. 3, both end portions of the core portion 12 are open outward, and an insertion unit 24 of the case holding unit 6, which will be described later, is inserted into an opening portion of the core portion 12 in the right section of the drawing. A protrusion 12a that is engaged with an engaging protrusion 26 which protrudes from the insertion unit 24 is formed on an inner circumferential surface of the core portion 12.

A lid member 16 that closes the accommodation space 11 is mounted on an opening portion in the left section of the drawing. The lid member 16 can be attached to or detached from the case 4 by operating a lever 16a that is disposed substantially at the center of the lid member 16.

As shown in FIG. 2, the guide space 13 is continuously formed from the upper portion of the accommodation space 11, and the guide hole 13a that communicates with the outside is formed downward. The end portion of the optical fiber cable 1 is supplied in a state of drooping further downward than the guide hole 13a.

The opening and closing member 14 that opens and closes the guide hole 13a can be opened and closed between a closed state of abutting against an outer surface of the case 4 and an open state of being apart from the outer surface. In the closed state, the optical fiber cable 1 is pinched between the opening and closing member 14 and the outer surface of the case 4, and the optical fiber cable 1 is prevented from being drawn out of the case 4.

A substantially L-shaped lever 14a is disposed at a position adjacent to the opening and closing member 14. The opening and closing member 14 can be in the open state or the closed state by moving the lever 14a in the horizontal direction.

As shown in FIGS. 2, 4A, and 4B, the work holding member 15 is fixed to an outer portion of the case 4 and is positioned under the guide hole 13a of the guide space 13, and is formed to hold the work 2 at a position extending from the optical fiber cable 1 drooping from the guide space 13.

Two protrusions 15a are formed in an end portion of the work holding member 15 on the guide hole 13a side. The optical fiber cable 1 passes between the protrusions 15a.

A concave portion 15b that is formed in the opposite direction to the guide hole 13a and accommodates part of the work 2 is formed in the protrusion 15a. An end portion of the plate-shaped work 2 is accommodated in the concave portion 15b.

According to this configuration, it is possible to prevent the work 2 from being detached from the work holding member 15 when the work 2 that is mounted on the optical fiber cable 1 is held by the work holding member 15 and the opening and closing member 14 is in the closed state in a state where the end portion of the work 2 is accommodated in the concave portion 15b.

A T-shaped protrusion 15c that is formed in the work holding member 15 and a T-shaped concave portion 4a that is formed in the case 4 are fitted into the work holding member 15 and the case 4. The work holding member 15 can be easily attached to or detached from the case 4 when moved in the depth direction shown in FIG. 2.

Accordingly, it is possible to change the work holding member 15 to another work holding member 15 corresponding thereto in a case where it is necessary to change the type of the work 2 that is mounted on the optical fiber cable 1.

Next, the case holding unit 6 that holds the case 4 will be described. The case holding unit 6 is configured to have a base member 21 that is disposed at a regular distance on the rotating table 5, a plate-shaped side wall 22 that is disposed upright further upward than the base member 21, four support rods 23 that protrude from the side wall 22, the substantially columnar-shaped insertion unit 24 that protrudes from the side wall 22 and is inserted into the core portion 12 of the case 4, and a cable holding mechanism 25 that is disposed in the base member 21 and holds the optical fiber cable 1 in the case holding unit 6.

As shown in FIG. 3, a gap is formed between an upper surface of the base member 21 and a lower surface of the case 4. The side wall 22 is in close contact with a side surface of the case 4 shown in the right section of the drawing.

As shown in FIGS. 2, 4A, and 4B, the support rods 23 are inserted into through-holes 4b that are formed at four corners of the case 4, and performs positioning of the case 4 while preventing a rotation of the case 4.

The insertion unit 24 is a cylindrical member that protrudes toward the case 4 side and can be inserted into the core portion 12. A tapered shape is formed at a tip thereof and the engaging protrusion 26 that protrudes toward an outer circumferential surface side from an inner portion of the insertion unit 24 and a lever 27 that is used to operate the engaging protrusion 26 are disposed therein.

The engaging protrusion 26 is biased by a spring 28 that is elastically mounted in the insertion unit 24 so as to protrude outward. When the case 4 is moved with respect to the case holding unit 6 from the left section in FIG. 3, the engaging protrusion 26 is moved over the protrusion 12a of the core portion 12 to be engaged therewith, and thus the case 4 is held by the case holding unit 6 so as not to be detached.

The lever 27 is pivotally supported in a swingable manner in the insertion unit 24, and one end thereof protrudes from an end portion of the insertion unit 24 toward the side of the side wall 22 opposite to the case 4.

When the lever 27 is operated, the other end of the lever 27 resists the biasing force of the spring 28 so that the engaging protrusion 26 is withdrawn into the insertion unit 24, and the state of engagement with the protrusion 12a of the core portion 12 is released so that the case 4 can be detached from the case holding unit 6.

The cable holding mechanism 25 is configured to have a base portion 29 that is disposed in the base member 21, and a cover 30 that is disposed to be capable of being attached to or detached from the base portion 29 by the magnetic force of a magnet, which is not shown herein.

A groove 29a to which the optical fiber cable 1 is fitted is formed in the base portion 29 in the up and down direction. The optical fiber cable 1 is positioned in front of the base portion 29 in a state where the cover 30 is removed from the base portion 29. In this state, the cover 30 is connected to the base portion 29 by the magnetic force of the magnet.

Then, the optical fiber cable 1 is pressed by the cover 30 and is moved to the center of the groove 29a of the base portion 29, and is held not to be moved during the transport by the rotating table 5.

In this manner, as the cable holding mechanism 25 is disposed in the base member 21 that is fixed to the rotating table 5, the optical fiber cable 1 can be handled in each of the work stations S based on a relative position with the cable holding mechanism 25 when the rotating table 5 stops each of the cases 4 at each of the work stations S.

Hereinafter, each of the work stations S will be described.

First, the supply and discharge station S1 will be described. As shown in FIG. 1, a supply conveyer 31 and a discharge conveyer 32 are disposed in parallel with each other at a position adjacent to the rotating table 5. The supply conveyer 31 and the discharge conveyer 32 transport the case 4 from the left section to the right section in FIG. 1.

A transfer mechanism such as a robot hand, which is not shown herein, is disposed in the supply and discharge station S1 so as to hold the case 4 that is transported by the supply conveyer 31 and mount the case 4 on the case holding unit 6 of the rotating table 5 which is positioned in the supply and discharge station S1.

In this case, the transfer mechanism moves the case 4 in the horizontal direction along the support rods 23 of the case holding unit 6 so that the side surface of the case 4 abuts against the side wall 22 and the engaging protrusion 26 of the insertion unit 24 is engaged with the protrusion 12a of the core portion 12 of the case 4, and thus the case 4 is positioned in the case holding unit 6 while being held not to be detached.

In the supply and discharge station S1, the transfer mechanism removes the case 4 from the case holding unit 6 and the case 4 is placed in the discharge conveyer 32 when the processing by the returning station S8 is completed and the case 4 is transported to the supply and discharge station S1 by the rotating table 5.

In this case, a lever operation mechanism, which is not shown herein, operates the lever 27 of the case holding unit 6 and causes the engaging protrusion 26 to withdraw into the insertion unit 24 so that the state of engagement with the protrusion 12a of the core portion 12 is released. In this state, the transfer mechanism removes the case 4 from the case holding unit 6 and transfers the case 4 to the discharge conveyer 32.

Figure 5:
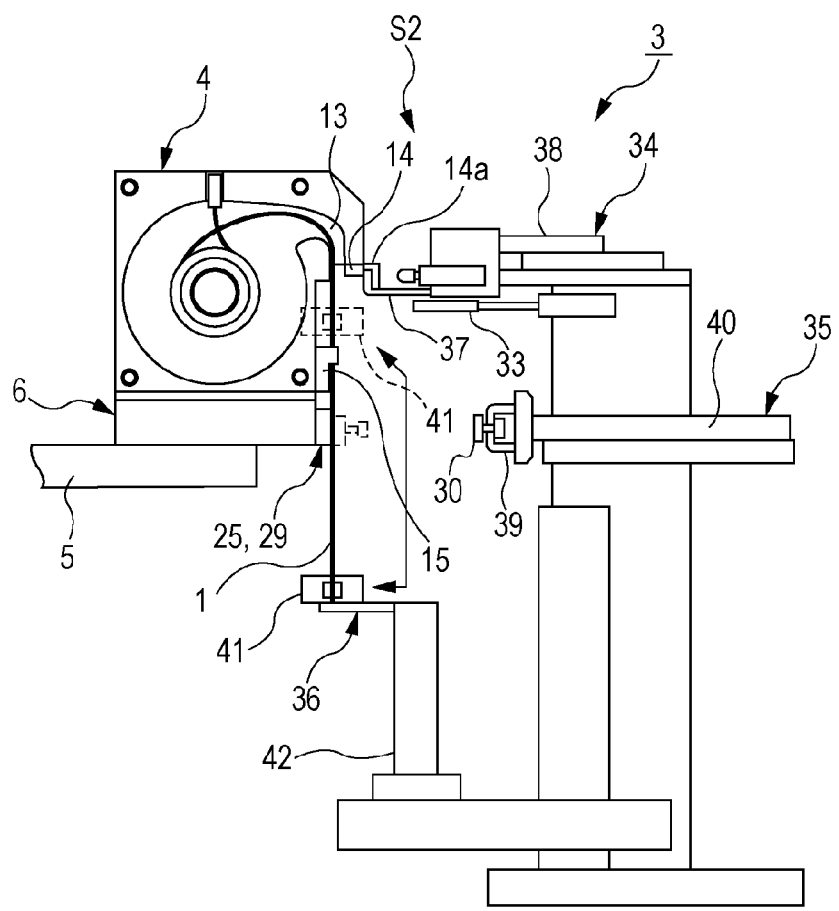
FIG. 5 is a side view showing a drawing station.

FIG. 5 is a view illustrating the drawing station S2. In the drawing station S2, the optical fiber cable 1 is drawn out of the case 4, and the tip portion thereof is held by the cable holding mechanism 25 of the case holding unit 6.

A sensor 33 that detects the optical fiber cable 1, an opening and closing member moving mechanism 34 that puts the opening and closing member 14 of the case 4 into the open state, a cover attaching and detaching mechanism 35 that attaches or detaches the cover 30 of the cable holding mechanism 25, and a drawing mechanism 36 that draws out the optical fiber cable 1 at a predetermined length from the case 4 are disposed in the drawing station S2.

The sensor 33 detects the optical fiber cable 1 drooping below the guide hole 13a of the case 4 that is transported by the rotating table 5. In a case where it is difficult to detect the optical fiber cable 1, a control mechanism determines the case 4 as defective, and causes each of the work stations on the downstream side to skip the operation.

The opening and closing member moving mechanism 34 is configured to have a hook 37 that is engaged with the lever 14a of the opening and closing member 14 of the case 4, and an air cylinder 38 that causes the hook 37 to reciprocate in the horizontal direction.

The air cylinder 38 causes the hook 37 to stand by in advance on a further inner circumferential side of the rotating table 5 than the lever 14a. When the case 4 reaches the drawing station S2, the air cylinder 38 moves the hook 37 to an outer circumferential side of the rotating table 5 so that the opening and closing member 14 is switched from the closed state to the open state and the optical fiber cable 1 can be drawn out.

The cover attaching and detaching mechanism 35 is configured to have a gripper 39 that grips a knob 30a of the cover 30, and an air cylinder 40 that moves the gripper 39 in the horizontal direction. When the air cylinder 40 moves the gripper 39 that grips the knob 30a, the cover 30 resists the magnetic force of the magnet which is disposed between the cover 30 and the base portion 29 and is detached.

The drawing mechanism 36 is configured to have a gripper 41 that grips the optical fiber cable 1, and a moving mechanism 42 that moves the gripper 41.

First, the gripper 41 that is moved by the moving mechanism 42 grips the optical fiber cable 1 drooping from the guide hole 13a of the case 4. In this case, a position of the optical fiber cable 1 may be recognized by a camera, which is not shown herein.

Next, the opening and closing member moving mechanism 34 puts the opening and closing member 14 of the case 4 into the open state, and puts the optical fiber cable 1 into a drawable state. In addition, the cover attaching and detaching mechanism 35 detaches the cover 30 from the base portion 29.

Then, the moving mechanism 42 moves the tip of the optical fiber cable 1 in such a manner that the tip avoids the work holding member 15 and the base portion 29 that are positioned under the guide hole 13a, and moves the tip to below the base portion 29.

In this manner, the optical fiber cable 1 is positioned in front of the base portion 29. In this state, the cover attaching and detaching mechanism 35 mounts the cover 30 on the base portion 29 so that the optical fiber cable 1 is pinched by the base portion 29 and the cover 30 by the magnetic force of the magnet.

In this manner, in the drawing station S2, the optical fiber cable 1 is drawn out of the case 4, and is held by the cable holding mechanism 25 that is disposed on the rotating table 5.

In this manner, in each of the work stations S that are positioned on the downstream side of the drawing station S1, a processing can be performed on the optical fiber cable 1 that is held by the cable holding mechanism 25.

In other words, in each of the work stations S, the position of the optical fiber cable 1 can be recognized with a position of the cable holding mechanism 25 as a reference, and a camera, a sensor, and the like that are used to detect the tip of the optical fiber cable 1 are not necessary in each of the work stations S.

Further, in each of the work stations S, it is not necessary to draw out the optical fiber cable 1 from the case 4 each time and to return the optical fiber cable 1 after the processing is completed. It is not necessary for the drawing and returning mechanisms to be disposed in each of the work stations. Also, the cycle time can be shortened in each of the work stations.

Figure 6A:
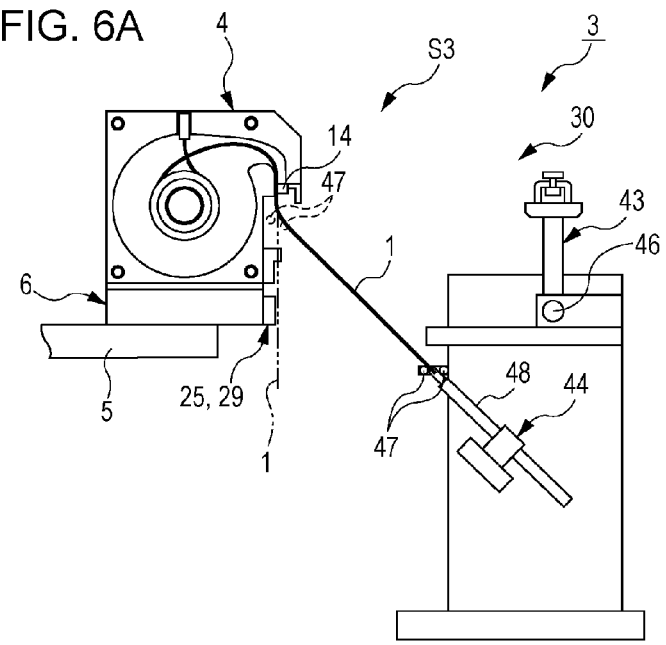
FIGS. 6A and 6B are side views showing a correction station, respectively showing a temporary holding mechanism and a correction mechanism.
Figure 6B:
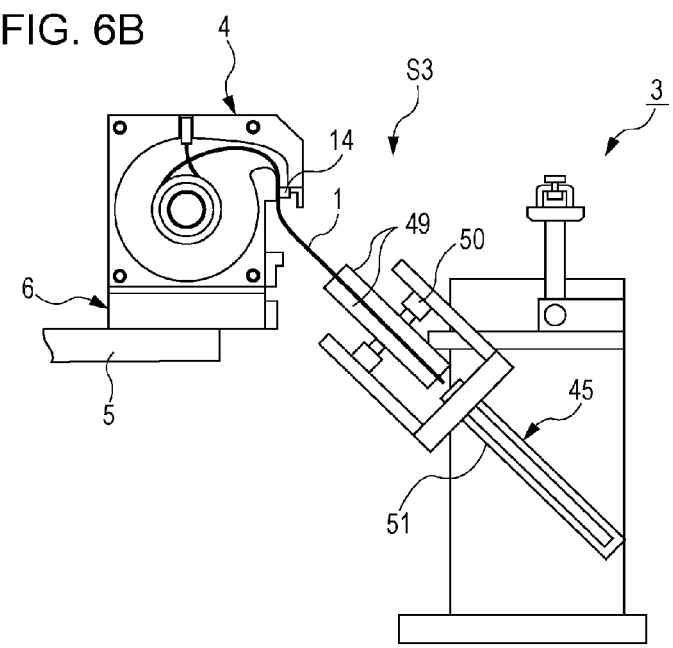

FIGS. 6A and 6B are views illustrating the correction station S3. The correction station S3 removes the bending tendency of the optical fiber cable 1 that is drawn out of the case 4.

The optical fiber cable 1 has the so-called bending tendency because the optical fiber cable 1 is wound around the core portion 12 in the case 4 that is supplied to the optical fiber cable processing device 3. The tip portion drooping out of the case 4 does not have a linear shape and the shape thereof is not uniform.

With the bending tendency, it is difficult to relatively move the tip of the optical fiber 1a and the work 2 and connect the tip of the optical fiber 1a with the work 2. Accordingly, the correction station S3 corrects the bending tendency of the optical fiber cable 1 in advance.

The correction station S3 has a cover attaching and detaching mechanism 43 that attaches and detaches the cover 30 of the cable holding mechanism 25, a temporary holding mechanism 44 (FIG. 6A) that obliquely and temporarily holds the optical fiber cable 1, and a correction mechanism 45 (FIG. 6B) that corrects the bending tendency of the optical fiber cable 1 that is drawn out of the case 4.

The cover attaching and detaching mechanism 43 is configured in the same manner as the cover attaching and detaching mechanism 35 that is disposed in the drawing station S2, and thus detailed description will be omitted herein. The cover is withdrawn by a swinging mechanism 46 so as to prevent an interruption with the optical fiber cable 1 that is held by the temporary holding mechanism 44 and the correction mechanism 45.

The temporary holding mechanism 44 is disposed obliquely under the case holding unit 6, and is configured to have two guide bars 47 and a moving mechanism 48 that moves the guide bars 47. The moving mechanism 48 moves the guide bars 47 in the oblique direction and the depth direction shown in FIGS. 6A and 6B.

First, when the case 4 is positioned in the correction station S3 and the cover attaching and detaching mechanism 43 removes the cover 30, the guide bars 47 are positioned under the guide hole 13a of the case 4 by the moving mechanism 48, and the optical fiber cable 1 is positioned between the two guide bars 47.

Then, the moving mechanism 48 moves the guide bars 47 obliquely downward, and the optical fiber cable 1 is guided by the guide bars 47 to be obliquely and temporarily held as shown in FIG. 6A.

In this case, the guide hole 13a of the case 4 is put into the closed state by the opening and closing member 14, and thus the optical fiber cable 1 is not drawn out of the case 4.

The correction mechanism 45 has two plates 49 that pinch the optical fiber cable 1, a heater that heats the plates 49, which is not shown herein, and an opening and closing mechanism 50 that has an air cylinder which brings the plates 49 into contact with each other or separates the plates 49 from each other, and the like.

The two plates 49 are disposed to be inclined in parallel with the optical fiber cable 1 that is obliquely and temporarily held by the temporary holding mechanism 44, and can be moved by a moving mechanism 51 which moves the plates 49.

Although not shown herein, a linear groove is formed in the plate 49 that is positioned in the lower section of the drawing, and a protrusion that is fitted with the groove is formed in the plate 49 which is positioned in the upper section of the drawing. The plates 49 are so long as to pinch at least the vicinity of the cutting portion of the optical fiber cable 1.

When the plate 49 in the lower section of the drawing is positioned, by the moving mechanism 51, below the optical fiber cable 1 that is held by the temporary holding mechanism 44, the opening and closing mechanism 50 causes the two plates 49 to approach each other to pinch the optical fiber cable 1, and the optical fiber cable 1 is pinched by the groove and the protrusion to be changed to a linear shape.

When the heater heats the plates 49 in this state, the linear state of the optical fiber cable 1 is maintained to match the shapes of the groove and the protrusion since the coating material 1b of the optical fiber cable 1 is the thermoplastic resin, and the bending tendency is removed.

When the bending tendency is corrected in this manner, the plates 49 opens the optical fiber cable 1 by the opening and closing mechanism 50 and are withdrawn by the moving mechanism 51. In this manner, the optical fiber cable 1 is directed downward because of the weight thereof and is straightly drooped.

The drooped optical fiber cable 1 is positioned in front of the base portion 29 of the cable holding mechanism 25, and the optical fiber cable 1 is held by the cable holding mechanism 25 again as the cover attaching and detaching mechanism 43 mounts the cover 30 on the base portion 29.

Then, the rotating table 5 can transport the optical fiber cable 1 whose bending tendency is corrected by the correction mechanism 45 to each of the work stations S on the downstream side.

Figure 7A:
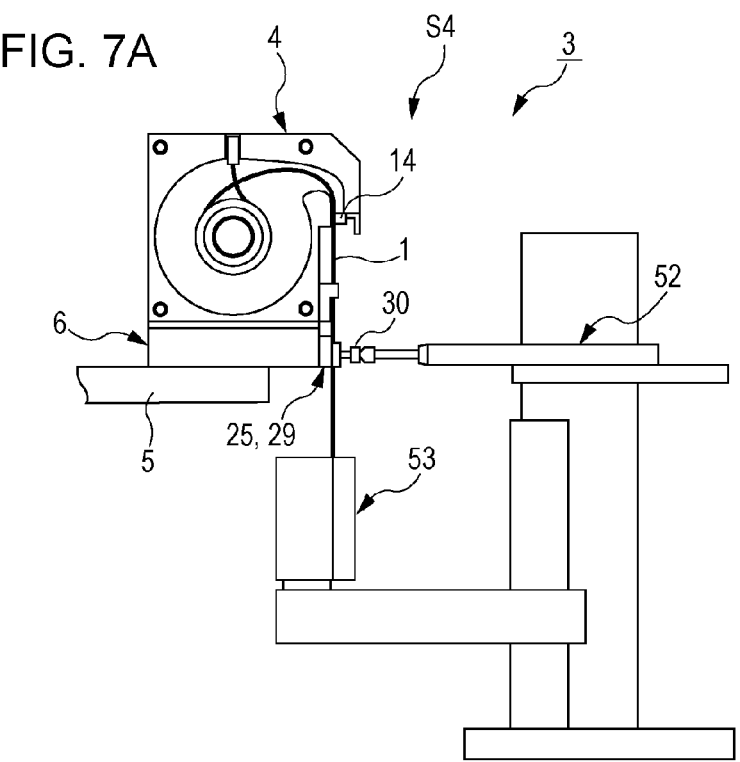
FIGS. 7A and 7B are views showing a coating removal station, which are a side view and an enlarged view illustrating a coating removal process, respectively.
Figure 7B:
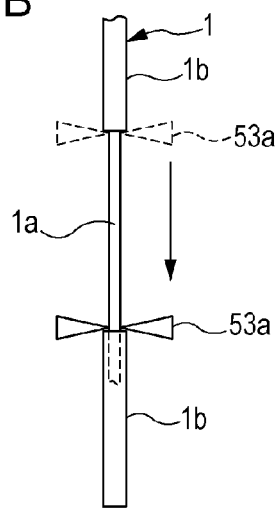

FIGS. 7A and 7B are views illustrating the coating removal station S4. In the coating removal station S4, the coating material 1b is removed from the tip of the optical fiber cable 1 and the optical fiber 1a is exposed.

A pressing mechanism 52 that presses the cover 30 of the cable holding mechanism 25 and a coating removal mechanism 53 that removes the coating material 1b from the tip of the optical fiber cable 1 are disposed in the coating removal station S4.

The pressing mechanism 52 is configured to press the cover 30 of the cable holding mechanism 25 from outside, and holds the optical fiber cable 1 so that the optical fiber cable 1 is not drawn out of the case 4 unnecessarily even when the optical fiber cable 1 is pulled by the coating removal mechanism 53.

The coating removal mechanism 53 will not be described in detail herein because the coating removal mechanism 53 is known in the related art. As shown in FIG. 7B, the coating removal mechanism 53 has a cutter 53a that is moved along an outer circumferential surface of the optical fiber cable 1 to cut only the coating material 1b, and a lifting mechanism that lifts the cutter 53a and displaces the cut coating material 1b downward along the optical fiber 1a, the lifting mechanism not being shown herein.

In the coating removal mechanism 53 of the embodiment, the cut coating material 1b is displaced downward by a predetermined distance along the optical fiber 1a so that the coating material 1b remains at the tip of the optical fiber 1a and the optical fiber 1a is exposed between the separated coating materials 1b.

Figure 8:
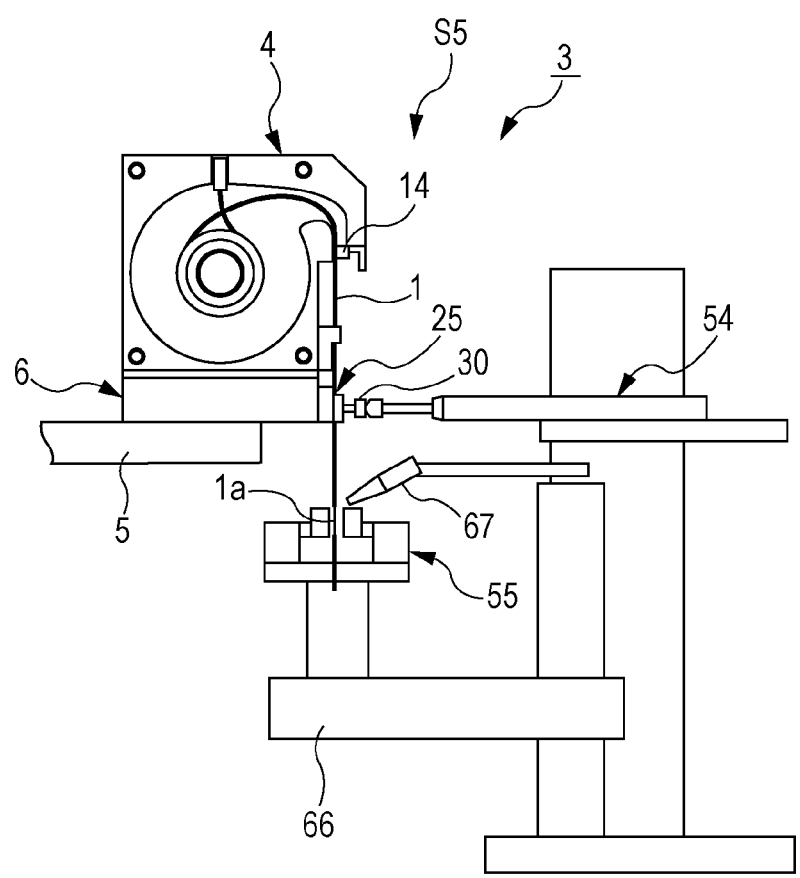
FIG. 8 is a side view showing a cleaning station.

FIG. 8 is a view illustrating the cleaning station S5. In the cleaning station S5, dregs or the like of a coating resin that is attached to the exposed optical fiber 1a are removed so that the outer circumferential surface of the optical fiber 1a is cleaned.

A pressing mechanism 54 that presses the cover 30 of the cable holding mechanism 25 and a cleaning mechanism 55 that cleans the exposed optical fiber 1a are disposed in the cleaning station S5.

As in the coating removal station S4, the pressing mechanism 54 presses the cover 30 and holds the optical fiber cable 1 so that the optical fiber cable 1 is not drawn out of the case 4 unnecessarily while the optical fiber 1a is cleaned by the cleaning mechanism 55.

Figure 9:
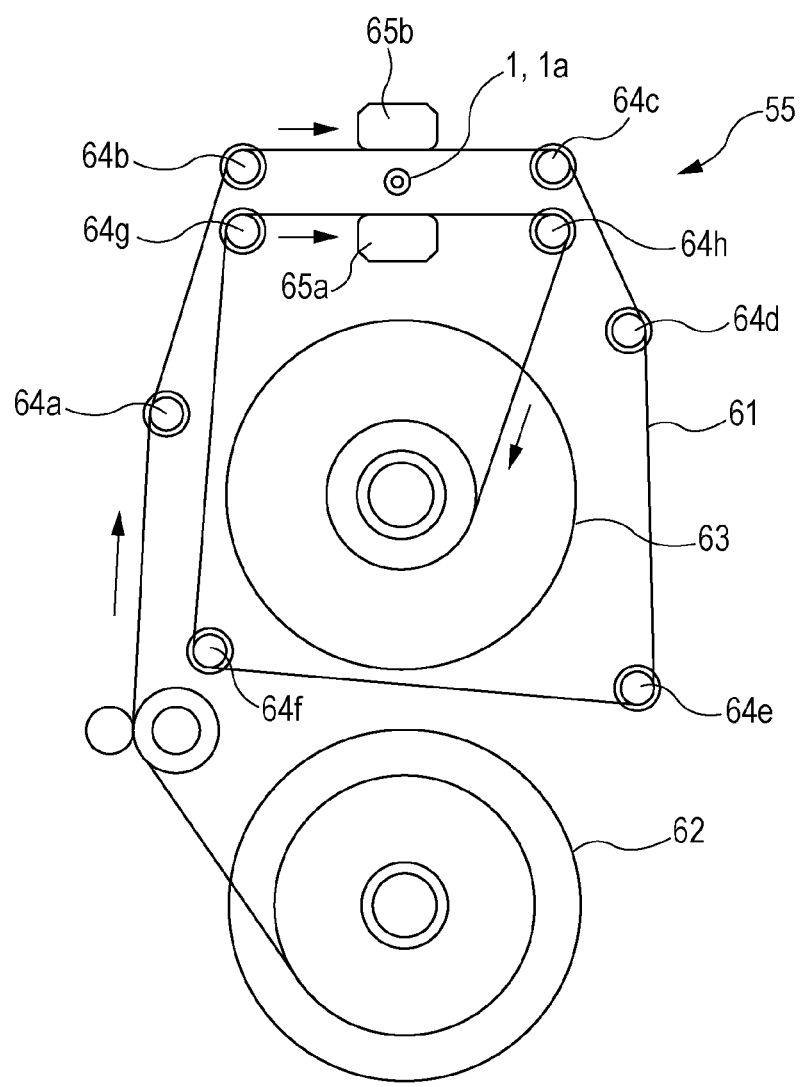
FIG. 9 is a plan view showing a cleaning mechanism.

As shown in FIG. 9, the cleaning mechanism 55 has a supply roll 62 that supplies a cleaning sheet 61 such as a non-woven fabric, a collection roll 63 that winds the cleaning sheet 61, a plurality of guide rolls 64a to 64h that are disposed between the supply roll 62 and the collection roll 63 and are disposed on a path of the cleaning sheet 61, and a pair of pressing members 65a and 65b that are disposed to pinch the optical fiber 1a with the respective cleaning sheets 61. The cleaning mechanism 55 is lifted by a lifting mechanism 66 (refer to FIG. 8).

An injection nozzle 67 (refer to FIG. 8) that injects a cleaning solution such as alcohol to the cleaning sheet 61 which is positioned between the pressing members 65a and 65b is disposed at a position adjacent to the cleaning mechanism 55.

The cleaning sheet 61 that is sent out of the supply roll 62 is disposed to pass through one and the other side portions of the optical fiber 1a by the guide rolls 64a to 64h. The pressing members 65 pinch the optical fiber 1a and are disposed on further outer sides of the cleaning sheet 61.

When the case 4 is positioned in the cleaning station S5 by the rotating table 5 and the pressing mechanism 54 presses the cover 30 of the cable holding mechanism 25, the entire cleaning mechanism 55 is lifted by the lifting mechanism 66, and the optical fiber 1a is positioned between the pair of pressing members 65a and 65b.

In this state, the injection nozzle 67 injects the cleaning solution to the cleaning sheet 61 that is positioned between the pressing members 65a and 65b and then the pressing members 65a and 65b approach each other so that the cleaning sheet 61 comes into contact with the outer circumferential surface of the optical fiber 1a.

In this state, the lifting mechanism 66 lowers the cleaning mechanism 55 so that the outer circumferential surface of the optical fiber 1a is wiped by the cleaning sheet 61. At this time, the cover pressing mechanism 54 presses the cover 30 of the cable holding mechanism 25 so that the optical fiber cable 1 is not drawn out of the case 4.

When the cleaning of the optical fiber 1a is completed and the pressing members 65a and 65b are separated from each other, the cleaning mechanism 55 is withdrawn downward from the optical fiber cable 1, and the supply roll 62 and the collection roll 63 are rotated to send out the cleaning sheet 61 and the unused cleaning sheet 61 is positioned between the pressing members 65a and 65b.

When the cleaning of the optical fiber 1a is completed and the cleaning mechanism 55 is withdrawn, the cover pressing mechanism 54 is detached from the cover 30 of the cable holding mechanism 25.

Figure 10A:
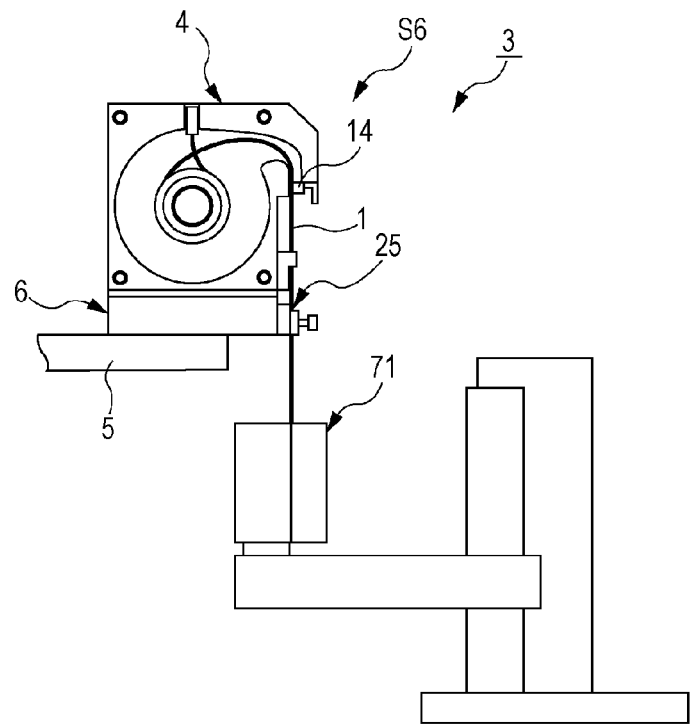
FIGS. 10A and 10B are views showing a cutting station, which are a side view and an enlarged view illustrating a cutting process, respectively.
Figure 10B:
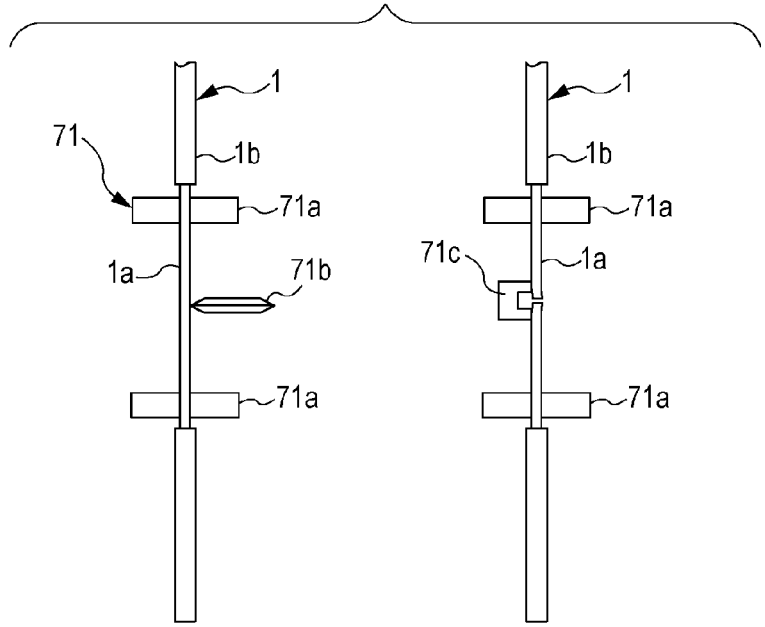

FIGS. 10A and 10B are views illustrating the cutting station S6. In the cutting station S6, the optical fiber 1a is cut and the end surface of the optical fiber 1a is formed into a shape with which the end surface can be connected to the work 2.

A cutting mechanism 71 that cuts the optical fiber 1a is disposed in the cutting station S6. As shown in FIG. 10B, the cutting mechanism 71 has a clamp 71a that holds upper and lower portions of the cutting position of the optical fiber 1a, a cutter 71b that forms a scratch on the outer circumferential surface of the optical fiber 1a, and a cutting button 71c that presses the vicinity of the scratch and breaks the optical fiber 1a.

The cutter 71b forms the scratch on the surface of the optical fiber 1a by moving along the outer circumferential surface of the optical fiber 1a. When the cutting button 71c presses the vicinity of the scratch in this state, a crack develops from the scratch and the optical fiber 1a is broken so that the end surface is provided with a desired shape.

FIGS. 11A and 11B are views illustrating the mounting station S7. In the mounting station S7, the work 2 is mounted on the end surface of the optical fiber 1a that is broken.

The mounting station S7 has a work holding mechanism 72 that holds the work 2, a first camera 73 and a second camera 74 that image the end surface of the optical fiber 1a and the work 2, and an adhesive supply mechanism 75 that supplies an adhesive which is used to adhere the optical fiber 1a with the work 2.

The work holding mechanism 72 holds the work 2 that is supplied from a work supply mechanism, which is not shown herein, so that the connection portion of the optical fiber 1a is directed upward, moves the work 2 in the horizontal direction and the up and down direction, and can rotate the work 2 on a horizontal plane.

As shown in FIG. 11A, when the case 4 is positioned in the mounting station S7, the first camera 73 is moved between the optical fiber cable 1 and the work 2 by the moving mechanism, which is not shown herein, and simultaneously performs the imaging in the up and down direction so as to image a position of the end surface of the optical fiber 1a in the horizontal direction and a position of the connection portion of the fiber in the work 2 in the horizontal direction.

The second camera 74 is disposed beside the optical fiber cable 1, and as shown in FIG. 11B, images the height of the end surface of the optical fiber 1a and the height of the connection portion of the fiber in the work 2.

The images of the first and second cameras 73 and 74 are processed by the control mechanism so that a positional relationship between the position of the end surface of the optical fiber 1a and the connection portion of the optical fiber 1a in the work 2 is recognized.

The control mechanism moves the work 2 in the horizontal direction while lifting the work 2 by the work holding mechanism 72 and rotates the work 2 on the horizontal plane if necessary so that the connection portion of the optical fiber 1a in the work 2 is positioned at the mounting position of the end surface of the optical fiber 1a (FIG. 11B).

The adhesive supply mechanism 75 supplies the adhesive formed of a photo-curable resin or the like. As shown in FIG. 11B, when the end surface of the optical fiber 1a is positioned in the connection portion of the optical fiber 1a in the work 2, the adhesive supply mechanism 75 supplies the adhesive to the connection portion thereof to adhere the end surface with the connection portion.

In the embodiment, the bending tendency of the optical fiber cable 1 is removed in the correction station S3, and thus the end portion of the optical fiber 1a is directed straight downward, these can be mounted by causing the work 2 to approach from below, and a mounting failure is prevented.

Figure 12A:
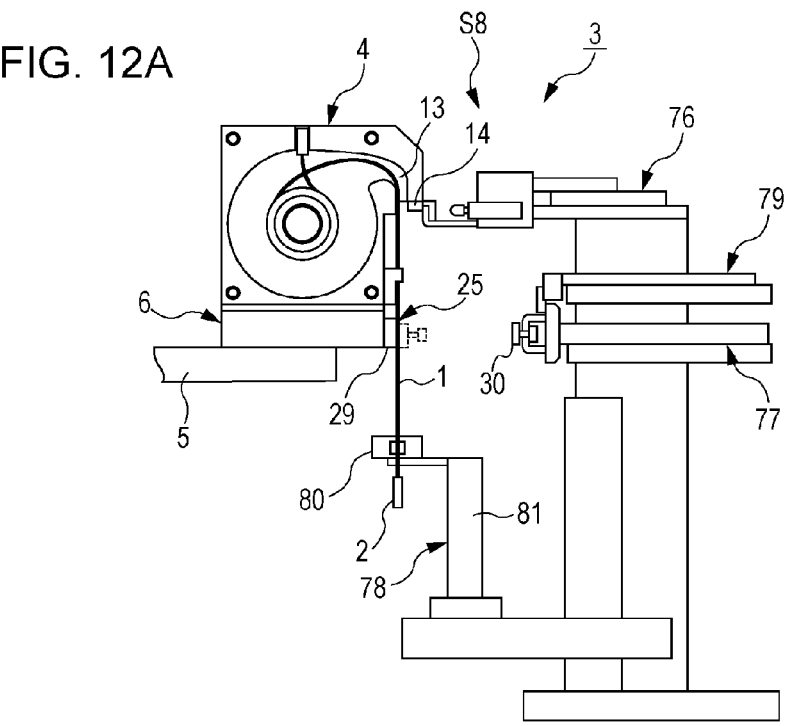
FIGS. 12A and 12B are views showing a returning station, respectively showing a state where the optical fiber cable is returned and a state where the work is held by the work holding member.
Figure 12B:
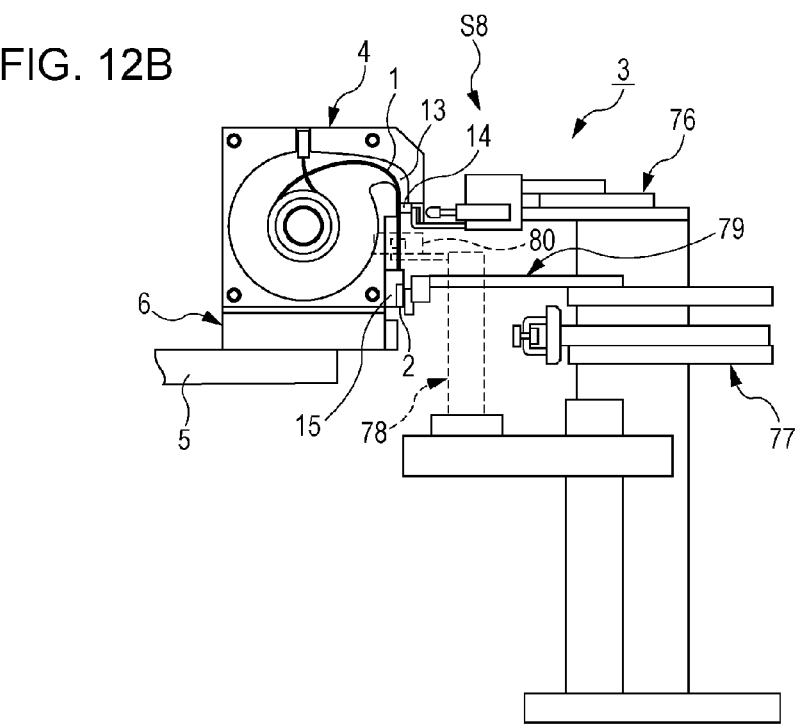

FIGS. 12A and 12B are views illustrating the returning station S8. In the returning station S8, the optical fiber cable 1 that is drawn out is returned to the case 4 and the work 2 is mounted on the case 4.

The returning station S8 has an opening and closing member moving mechanism 76 that moves the opening and closing member 14 of the case 4, a cover attaching and detaching mechanism 77 that attaches or detaches the cover 30 of the cable holding mechanism 25, a returning mechanism 78 that returns the optical fiber cable 1 into the case 4, and a work installation guide mechanism 79 that causes the work 2 to be held by the work holding member 15.

The opening and closing member moving mechanism 76 and the cover attaching and detaching mechanism 77 will not be described in detail herein because the opening and closing member moving mechanism 76 and the cover attaching and detaching mechanism 77 have a common configuration with the opening and closing member moving mechanism 34 and the cover attaching and detaching mechanism 35 in the drawing station S2. When the case 4 is positioned in the returning station S8, these are operated so that the opening and closing member 14 of the case 4 is put into the open state and the cover 30 of the cable holding mechanism 25 is removed.

As is the case with the drawing mechanism 36 in the drawing station S2, the returning mechanism 78 has a gripper 80 and a moving mechanism 81. Initially, the gripper 80 holds the vicinity of the connection portion of the optical fiber cable 1 that is connected to the work 2 (FIG. 12A).

Next, the optical fiber cable 1 is lifted by the moving mechanism 81, and the work 2 is moved to front of the work holding member 15 which is positioned below the guide hole 13a (FIG. 12B).

The work installation guide mechanism 79 is disposed at the height of the work holding member 15 of the case 4, and abuts against the work 2 so as to move the work 2 to the work holding member 15 side when the work 2 is lifted to the vicinity of the work holding member 15.

In other words, when the returning mechanism 78 moves the gripper 80 upward by the moving mechanism 81, the work 2 abuts against the work installation guide mechanism 79 and is guided to approach the case side, and an upper end portion of the work 2 is fitted into the concave portion 15b of the work holding member 15.

Then, when the opening and closing member 14 is put into the closed state by the opening and closing member moving mechanism 76, the work 2 is held not to be detached from the concave portion 15b of the work holding member 15.

The case 4 on which the work 2 is mounted in this manner is transported to the supply and discharge station S1 again by the rotating table 5.

In the supply and discharge station S1, the lever operation mechanism, which is not shown herein, operates the lever 27 of the case holding unit 6 and causes the engaging protrusion 26 of the insertion unit 24 to be detached from the protrusion 12a of the core portion 12. Then, the transfer mechanism removes the case 4 from the case holding unit 6 and transfers the case 4 to be placed onto the discharge conveyer 32.

In the above-described embodiment, the processing onto the optical fiber cable 1 is an example, and the number of the work stations can be increased or decreased.

It should be understood by those skilled in the art that various modifications, combinations, sub-combinations and alterations may occur depending on design requirements and other factors insofar as they are within the scope of the appended claims or the equivalents thereof.

What is claimed is:

1. An optical fiber cable processing device comprising:
   a transport mechanism which transports a case that accommodates an optical fiber cable that is an optical fiber coated with a coating material and in which a plurality of work stations are set along a transport path of the case; and
   a processing mechanism that is disposed in each of the work stations to perform each of desired operations on the optical fiber cable,
   wherein any one of the plurality of work stations is a mounting station in which a work mounting mechanism mounts a work on a tip of the optical fiber cable,
   wherein a drawing mechanism that draws out the optical fiber cable by a predetermined length from the case and a correction mechanism that corrects a bending tendency of the optical fiber cable that is drawn out of the case are disposed in the work stations on an upstream side of the mounting station, and
   wherein the transport mechanism transports the case to the mounting station and mounts the work on the tip of the optical fiber cable that is drawn out of the case in a state where the optical fiber cable which is corrected by the correction mechanism is drawn out of the case.

2. The optical fiber cable processing device according to claim 1,
   wherein the coating material is a thermoplastic resin,
   wherein the correction mechanism includes:
   two plates that pinch the optical fiber cable;
   a heater that heats the plates; and
   an opening and closing mechanism that brings the plates into contact with each other or separates the plates from each other,
   wherein a linear groove is formed in one of the plates and a protrusion that is fitted into the groove is formed in the other of the plates, and
   wherein the bending tendency of the optical fiber cable is corrected by heat from the heater in a state where the two plates are caused to approach each other by the opening and closing mechanism so that the optical fiber cable has a linear shape by the groove and the protrusion.

3. The optical fiber cable processing device according to claim 1,
   wherein the drawing mechanism is disposed in a drawing station and the correction mechanism is disposed in a correction station which is placed on a downstream side of the drawing station, and
   wherein the bending tendency of the optical fiber cable that is drawn out to the drawing station is corrected in the correction station.

4. The optical fiber cable processing device according to claim 1,
   wherein the case has:
   an accommodation space that accommodates the optical fiber cable;
   a core portion that is disposed in the accommodation space so that the optical fiber cable is wound therearound;
   a guide space that is formed to be adjacent to the accommodation space so as to guide an end portion of the optical fiber cable outward; and
   an opening and closing member that opens or closes a guide hole of the guide space to hold the optical fiber cable,
   wherein the optical fiber cable is not drawn out of the case when the opening and closing member is in a closed state,
   wherein an opening and closing member moving mechanism that puts the opening and closing member into an open state is disposed in the work station in which the drawing mechanism is disposed, and
   wherein the opening and closing member moving mechanism puts the opening and closing member into the open state to allow the optical fiber cable to be drawn out of the case when the drawing mechanism causes the optical fiber cable to be drawn out of the case.

5. The optical fiber cable processing device according to claim 4,
   wherein the core portion of the case is formed into a hollow cylindrical shape and an end portion thereof is disposed to be open outward,
   wherein the transport mechanism includes:
   a substantially cylindrical insertion unit that is fitted onto an inner circumferential surface of the core portion; and
   an engaging protrusion that protrudes from an inner portion of the insertion unit to an outer circumferential surface side and is engaged with an engaged portion that is formed on the inner circumferential surface of the core portion, and
   wherein the insertion unit is inserted and fitted into the core portion of the case and the engaging protrusion is engaged with the engaged portion of the core portion so that the case is held by the transport mechanism when the case is supplied to the transport mechanism.

6. The optical fiber cable processing device according to claim 1,
wherein a returning station that returns the optical fiber cable which is drawn out of the case into the case is disposed on a downstream side of the mounting station,
wherein a work holding member that accommodates the work which is mounted on the tip of the optical fiber cable is disposed in the case, and
wherein a returning mechanism that returns the optical fiber cable into the case and a work installation guide mechanism that guides the work to be held by the work holding member when the optical fiber cable is returned into the case by the returning mechanism are disposed in the returning station.

7. An optical fiber cable processing method,
wherein a case which accommodates an optical fiber cable which is an optical fiber coated with a coating material is transported by a transport mechanism in which a plurality of work stations are set along a transport path and each of desired operations is performed on the optical fiber cable by a processing mechanism that is disposed in each of the work stations,
wherein any one of the plurality of work stations is a mounting station in which a work mounting mechanism mounts a work on a tip of the optical fiber cable,
wherein a drawing mechanism draws out the optical fiber cable by a predetermined length from the case and a correction mechanism corrects a bending tendency of the optical fiber cable that is drawn out of the case in the work stations on an upstream side of the mounting station, and
wherein the transport mechanism then transports the case to the mounting station and mounts the work on the tip of the optical fiber cable that is drawn out of the case in a state where the optical fiber cable which is corrected is drawn out of the case.

8. A case for an optical fiber cable which accommodates an optical fiber cable that is an optical fiber coated with a coating material, the case comprising:
a an accommodation space that accommodates the optical fiber cable;
a core portion that is disposed in the accommodation space so that the optical fiber cable is wound therearound;
a guide space that is formed to be adjacent to the accommodation space so as to guide an end portion of the optical fiber cable outward; and
an opening and closing member that opens or closes a guide hole of the guide space to hold the optical fiber cable, and
wherein the optical fiber cable is prevented from being drawn out of the case by putting the opening and closing member into a closed state.

9. The case for an optical fiber cable according to claim 8,
wherein the core portion is formed into a hollow cylindrical shape and an end portion thereof is disposed to be open outward, and
wherein the case is held by a case holding mechanism that has:
a substantially cylindrical insertion unit that can be inserted into an opening portion of the core portion; and
an engaging protrusion that protrudes from an inner portion of the insertion unit to an outer circumferential surface and is engaged with a protrusion that is formed on an inner circumferential surface of the core portion.

10. The case for an optical fiber cable according to claim 9,
wherein a plurality of insertion holes that are parallel with an axial direction of the core portion are bored at positions which avoid the accommodation space and the guide space,
wherein the case holding mechanism is disposed in parallel with an axial direction of the insertion unit and has a support rod which is inserted into the insertion hole, and
wherein the support rod is inserted into the insertion hole and the case is held not to be rotated when the insertion unit is inserted into the core portion.

11. The case for an optical fiber cable according to claim 8,
wherein a work holding member that holds a work which is mounted on the end portion of the optical fiber cable is disposed at a position that is adjacent to the guide hole of the guide space, and
wherein the work is prevented from being detached from the work holding member by putting the opening and closing member into the closed state in a state where the work is accommodated by the work holding member.

* * * * *